United States Patent [19]
Porsche

[11] Patent Number: 5,048,944
[45] Date of Patent: Sep. 17, 1991

[54] EYEGLASSES WITH REMOVABLE LENS ASSEMBLY

[75] Inventor: Ferdinand A. Porsche, St. Georgen, Austria

[73] Assignee: Optyl Eyewear Fashion International Corporation, Norwood, N.J.

[21] Appl. No.: 246,987

[22] Filed: Sep. 20, 1988

Related U.S. Application Data

[62] Division of Ser. No. 68,639, Jun. 30, 1987, Pat. No. 4,822,158.

[51] Int. Cl.$^5$ ............................................. G02C 7/08
[52] U.S. Cl. .................................................... 351/57
[58] Field of Search ................... 351/57, 58, 106, 107, 351/108

[56] References Cited

U.S. PATENT DOCUMENTS

| | | | |
|---|---|---|---|
| 2,738,709 | 9/1951 | Matthews et al. | 88/41 |
| 4,176,921 | 12/1979 | Matthias | 351/106 |
| 4,523,819 | 6/1985 | Dianitsch et al. | 351/106 |
| 4,632,526 | 12/1986 | Lhospice | 351/57 |

Primary Examiner—Rodney B. Bovernick
Assistant Examiner—P. M. Dzierzynski
Attorney, Agent, or Firm—Fitch, Even, Tabin & Flannery

[57] ABSTRACT

Eyeglasses of the type which permit interchanging of framed lenses are disclosed which employ a lens assembly including a pair of lenses mounted in a frame. The frame, in turn, is releasably mounted to a backing support which supports the upper portion of the frame and includes a retaining clip pivotally mounted between an open position permitting easy mounting of the lens assembly, and a second closed position which maintains engagement between the lens and backing assemblies.

2 Claims, 4 Drawing Sheets

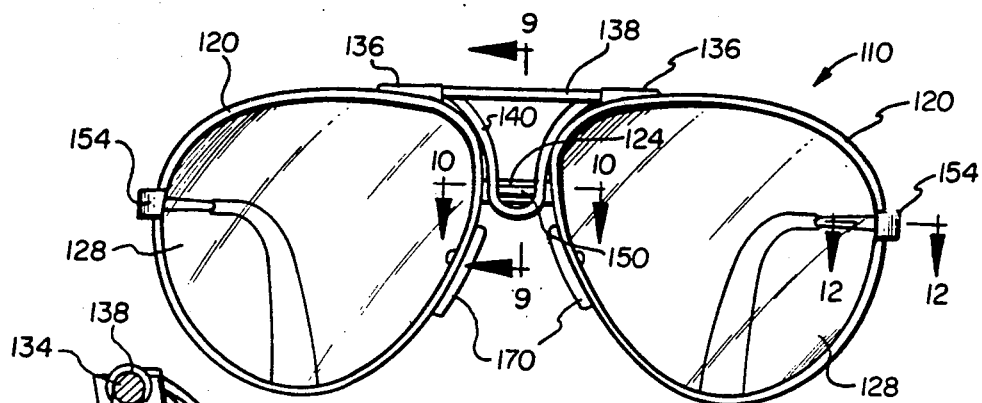
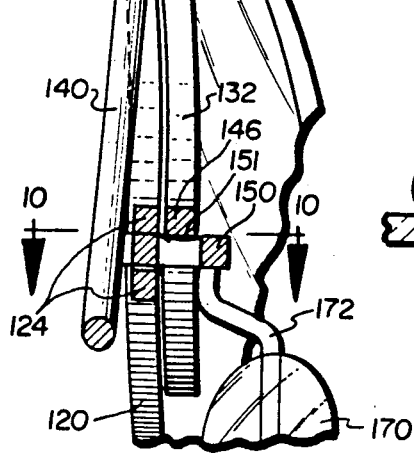
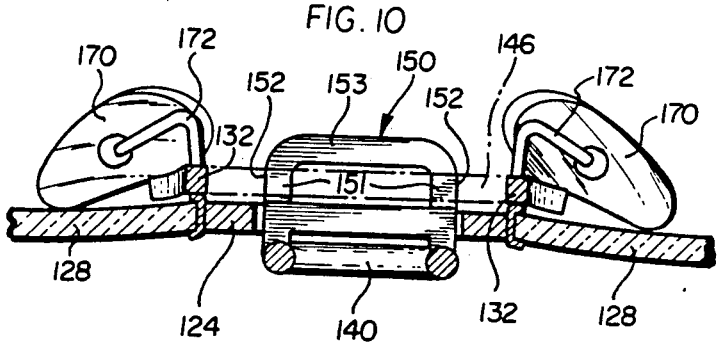
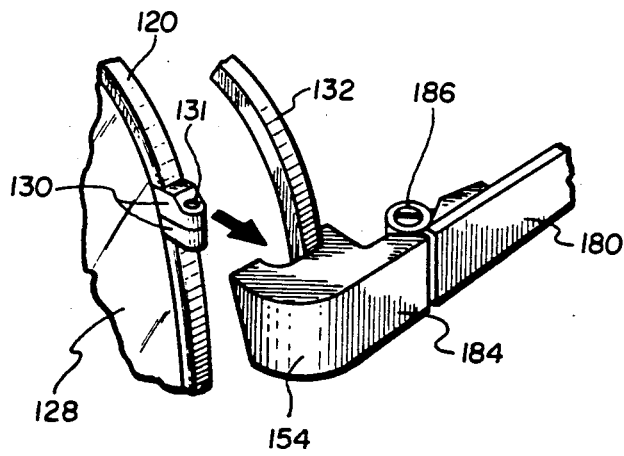
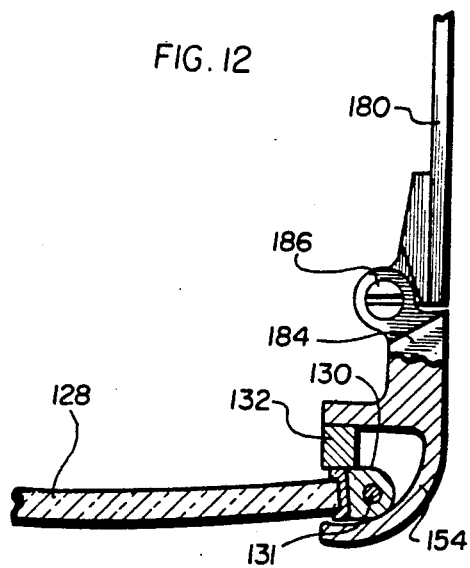

5,048,944

EYEGLASSES WITH REMOVABLE LENS ASSEMBLY

This is a division of application Ser. No. 07/068,639, filed June 30, 1987, which issued Apr. 18, 1989, as U.S. Pat. No. 4,822,158.

This invention relates generally to eyeglasses and, more particularly, to eyeglasses having readily exchangeable lens assemblies.

BACKGROUND OF THE INVENTION

Eyeglasses having exchangeable lenses or lens assemblies offer several advantages over conventional eyeglasses having fixed lenses. For example, in the case of sunglasses, different pairs of lenses can be provided for varying light conditions. Some of these lenses are preferably polarized to protect the eyes against ultraviolet rays. In the case of prescription glasses, lenses manufactured to the current prescription of the wearer can be easily exchanged for the out-of-date prescription lenses. Also, in the case of lens and/or frame damage, a single component can be replaced more economically than purchasing an entirely new pair of eyeglasses.

Exchangeable lens eyeglasses have been known for some time but older designs have had significant shortcomings in that they are generally of complex mechanical structure making them expensive to manufacture. Other designs require substantial mutual deformation of the lens and the front component of the frame making insertion and removal of a lens cumbersome and difficult.

Recently introduced exchangeable eyeglass designs have overcome these shortcomings by making replacement of the lenses convenient. In one structure disclosed in U.S. Pat. No. 4,176,921, the eyeglass front is disclosed as being made of wire with complete rims (rims completely encompassing the lenses). Welded to the wire rims are two spaced lower prongs for supporting each lens. An additional prong extends adjacent the temple piece, and is either integral with the rim, or is secured in another welded joinder. The lenses, which are stored without a frame means until ready for use, are inserted from above until they are embraced by the prongs. A metal lever is hinged to the bridge joining the rims and carries a prong for each lens. The lever is rotated downwardly to a holding position, to prevent upward movement of the lenses. Separate plastic nose pads are attached to the wire front. The eyeglasses shown in this patent have met with widespread success but they are relatively expensive due to the complete wire front, which is typically formed of a wire stock, and must be welded in a separate forming step to form a closed loop. Also, a complete wire rim is limited in its ability to accommodate designer materials and colors.

Complete wire rims, especially those for mating with exchangeable lenses can present a problem in that the wire rims are susceptible to bending or other deformation, which destroys the relatively close-tolerance lens-conforming configuration. Also, the lenses themselves are unsupported during storage. Plastic lenses may tend to warp if stored under conditions of excessive heat or pressure.

An eyeglass configuration for a front assembly having partial rims (rims which extend about the periphery of typically only the upper or lower portion of the lenses) is disclosed in U.S. Pat. No. 4,523,819. The eyeglass front includes wires or threads which are received in grooves in the exposed bottom edges of the lenses. The threads are fastened to one end of their associated partial rim and meet at the bridge section of the front where their remaining ends are held by the free ends of pivotal levers for tensioning the threads. A retainer clip, which is hinged to a lower bridge member, overlies the lever free ends to maintain the levers in their tensioning positions. The front used in the eyeglasses is preferably formed of metal to accommodate the wear occasioned by the use of pivoting components, to permit the attachment of prongs, and to provide adequate strength for tensioning. While generally satisfactory, the eyeglasses shown in this patent present some difficulties for wearers who have limited manual dexterity or who are engaged in outdoor winter sports or other activities requiring gloves.

Another arrangement of an interchangeable eyeglass configuration is shown in U.S. Pat. No. 2,738,709. An eyeglass frame made of wire is provided for mounting two lenses, and includes an intermediate metal bridge portion. The wire frame is adapted to be received behind an overlying plastic frame containing the customary temple pieces for engaging the temples and ears of a wearer. Both the wire frame and the overlying plastic frame have complete rims which completely encircle the lenses. Recesses are provided in the rear of the overlying plastic frame (adjacent the wearer's face), to receive the entire rim portions of the wire frame. Two hingeable latches are provided on the overlying plastic frame adjacent the temple pieces to secure the wire frame thereto.

This interchangeable eyeglass arrangement has considerable mass or bulk and is therefore relatively heavy. The overlying plastic frame must be sufficiently bulky at its bridge and rim portions to hide or mask the underlying wire frame, and the front of the overlying plastic frame has enlarged bulk adjacent its temple portions to accommodate the separately formed hingeable latches.

This design relies on frictional engagement between the wire and plastic bridges which is susceptible to wear over years of use. To compensate for this wear, the temple pieces can be adjusted to increase pressure on the wearer's ear, thereby pressing the bridge portions together, but this may be uncomfortable over extended wearing times.

SUMMARY OF THE INVENTION

It is therefore a principal object of the present invention to provide eyeglasses of a simple, two-piece construction, which require a minimum of manual dexterity for assembly.

It is another object of the present invention to provide a two-piece eyeglass construction of the above-described type having a minimal number of inexpensive components.

Yet another object of the present invention is to provide a two-part eyeglass assembly having a partially hidden partial wire rim which can accommodate a lens assembly of differing designer materials and colors which completely supports the eyeglass lenses.

These and other objects of the present invention which will become apparent from studying the drawings and description herein, are provided in eyeglasses including a lens assembly and a frame-mounting assembly. The lens assembly includes a pair of lenses and frame means, consisting of front and back surfaces, having lens-mounting sections surrounding each lens and joined together by a joining section. The frame-mounting assembly includes backing members for engaging the upper portion of the back surfaces of the lens-mounting sections. An upper bridge, and a lower bridge beneath the upper bridge, join the backing members. A retainer clip pivots on the upper bridge and is movable between an upper open position and a lower locked position with the lower bridge. The retainer clip engages the front surface of the joining section when in its lower locked position to releasably mount the lens assembly on the frame-mounting assembly.

BRIEF DESCRIPTION OF THE DRAWINGS

In the drawings, wherein like elements are referenced alike,

FIG. 8 is a front elevational view of the eyeglasses of FIGS. 6 and 7;

FIG. 9 is a fragmentary cross-sectional elevational view taken along the line 9—9 of FIG. 8 and looking in the direction of the arrows;

FIG. 10 is a fragmentary cross-sectional plan view, taken along the lines 10—10 of FIGS. 8 and 9 and looking in the direction of the arrows;

FIG. 11 is a fragmentary perspective view of the lower right-hand portion of FIGS. 6 and 7, shown in greater detail; and FIG. 12 is a fragmentary cross-sectional view, taken along the line 12—12 of FIG. 7 and looking in the direction of the arrows.

DETAILED DESCRIPTION OF THE PREFERRED EMBODIMENTS

Figure 1:
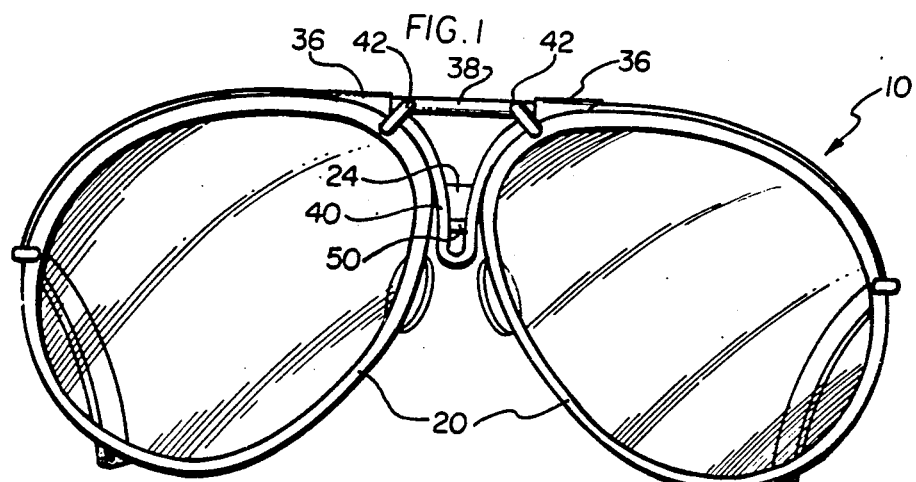
FIG. 1 is a front elevational view of eyeglasses constructed in accordance with the preferred embodiment of the present invention.
Figure 2:
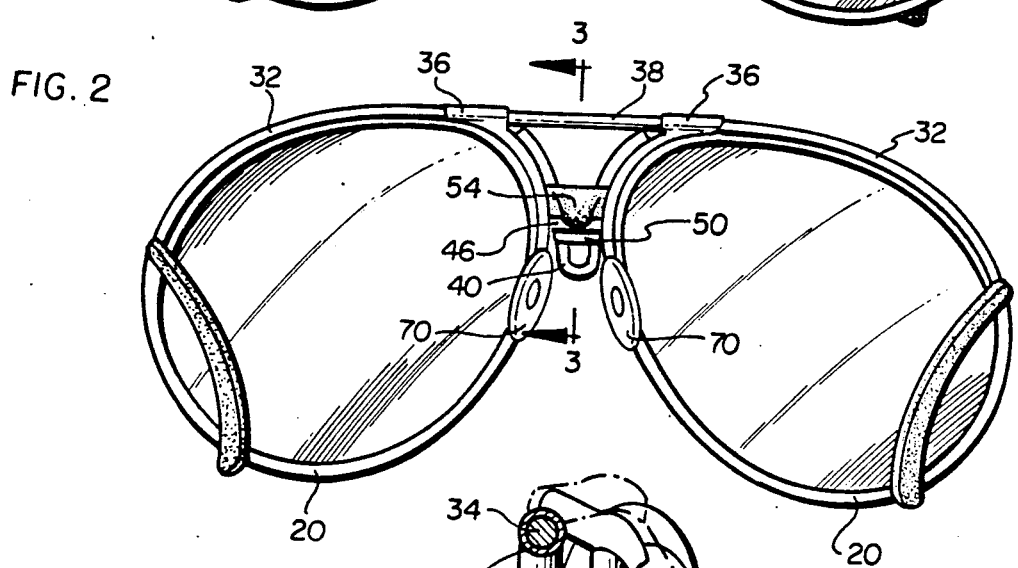
FIG. 2 is a rear elevational view of the eyeglasses of FIG. 1.
Figure 3:
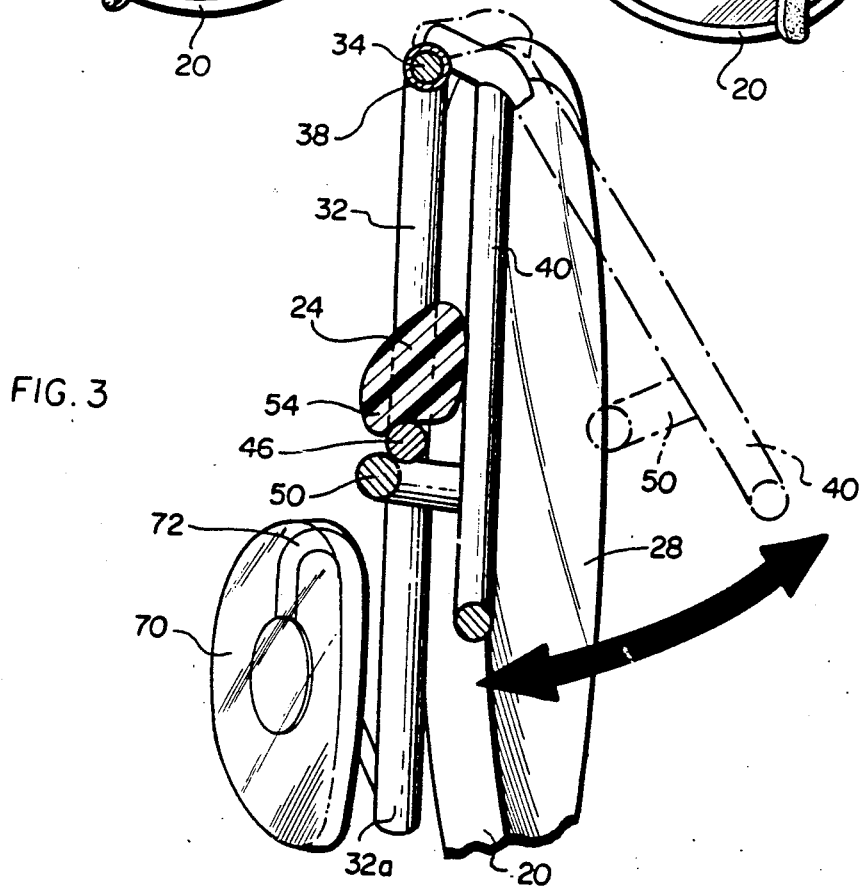
FIG. 3 is a fragmentary sectional view, on an enlarged scale, taken substantially along line 3—3 of FIG. 2, looking in the direction of the arrows.
Figure 4:
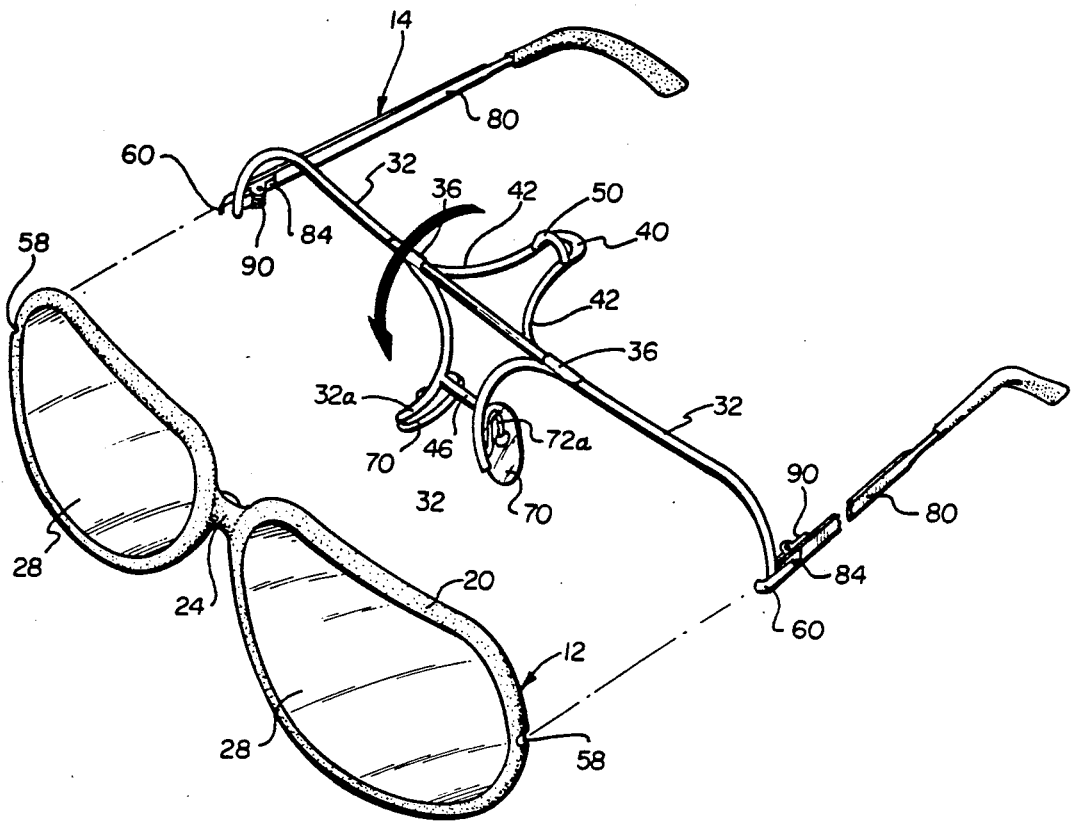
FIG. 4 is an exploded perspective view of the eyeglasses of the preceding Figures.
Figure 5:
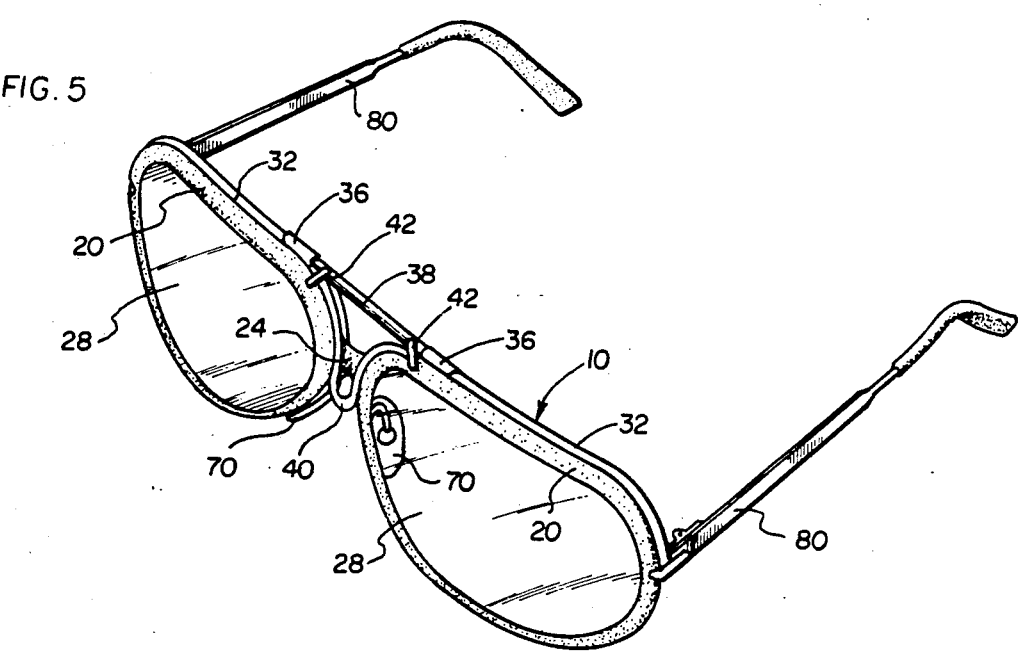
FIG. 5 is a perspective view of a completed assembly of the eyeglasses of FIG. 4.

Referring now to the drawings, and initially to FIGS. 1 and 4, eyeglasses constructed in accordance with one embodiment of the present invention are indicated generally at 10. As shown most clearly in FIG. 4, eyeglasses 10 include a lens assembly, indicated generally at 12, and a frame mounting or backing assembly indicated generally at 14. FIGS. 1-3 and 5 show the lens assembly 12 fully mounted on the backing assembly 14, ready for use by a wearer. It will be readily appreciated by those skilled in the art that lens assembly 12 and backing assembly 14 can accommodate a great variety of lens shapes and is not limited to the shape shown in the illustrated embodiment.

Lens assembly 12 includes lens mounting or receiving portions 20 connected together by a joining section 24. Lens-receiving sections 20 and joining section 24 are conveniently molded together to form a unitary plastic frame. Each lens-receiving section 20 includes interior recesses (not shown) for engaging the outer edges of lenses 28, as is known in the art.

Lens-receiving sections 20 and joining section 24 need not be integrally formed, and need not be made of plastic. A specific advantage of the eyeglasses constructed according to the present invention is that a variety of designer materials may be employed for the lens-receiving sections and the joining section, as will become apparent herein.

Backing assembly 14 is preferably comprised of gold-plated metal formed of several pieces which are welded together, using conventional techniques. Backing assembly 14 includes backing members 32 which engage the rear surface of lens assembly 12, the surface immediately adjacent the wearer's face. An upper bridge 34 is positioned intermediate backing members 32, and is welded at either end thereto at 36. Upper bridge 34 is hidden from view in all the figures except the cross-sectional view of FIG. 3, by an outer tubular member 38 which is free to rotate about upper bridge 34. A bail-like retaining clip 40 is fixed to tube 38 by welded prong members 42. Thus, bail 40 is pivotally mounted to upper bridge 34 by reason of its welded securement to tube 38.

As shown most distinctly in FIG. 4, a lower bridge member 46, located beneath upper bridge member 34, interconnects backing members 32 by welded securement at each end thereto. Retaining clip 40 includes a generally U-shaped detent or camming member 50 which snaps over the lower portion of lower bridge 46, as shown most clearly in the cross-sectional view of FIG. 3. To facilitate the snap-in resilient locking of camming member 50 with lower bridge 46, the camming member is upwardly inclined at its rearmost surface as shown most clearly in FIG. 3. Thus, when retaining clip 40 is downwardly rotated to snap in place, camming member 50 engages the outer lower curved surface of lower bridge 46 and, with continued application of pressure, is resiliently deflected over the bottommost surface of lower bridge 46 for a snap-like detent engagement. This provides a secure lock between retaining clip 40 and lower bridge 46, as more fully explained in commonly assigned U.S. Pat. Nos. 4,176,921 and No. 4,523,819, which are herein incorporated by reference to the extent necessary for a complete understanding of this and other aspects of the present invention.

As seen most clearly in FIG. 3, retaining clip 40 engages the forward surface of joining section 24 when locked in place to secure lens assembly 12 on backing assembly 14. As shown in FIGS. 2 and 3, joining section 24 is conveniently formed with a lower depending hook member 54 which overlies a rearward portion of lower bridge 46 at its upper extent. Preferably, depending hook member 54 does not extend below the center line of lower bridge 46. This is only as a matter of convenience for easy mounting and demounting of the central portion of lens assembly 12 on backing assembly 14. If desired, hook member 54 can extend in a downward direction to engage a greater part of lower bridge 46.

Bridging section 24 is held captive on the central section of backing assembly 14 by portions of retaining clip 40 located adjacent camming member 50. To further assist in this mating engagement, prongs 42, located adjacent the end portions of tube 38, engage the central portion of lens-receiving sections 20 when retaining clip 40 is lowered into its locked position (see especially FIGS. 1 and 5). This configuration provides a very tight engagement between the lens and backing assemblies, and stresses in the frame-engaging portions of the backing assembly are well supported to prevent any play in the moving parts thereof, during locking.

The lateral extremities of lens-receiving sections 20 include recesses 58 for receiving prongs 60 which are welded to backing members 32, adjacent their outermost extremities. Prongs 60 and recesses 58 ensure adequate engagement between the outer lateral part of lens assembly 12 and backing assembly 14. Hook member 54, in its engagement with lower bridge 46, prevents downward movement of the lens assembly, and the engagement of prongs 42 with the inner part of lens-receiving sections 20 prevents an upward movement of lens assembly 12. Retaining clip 40 restrains lens assembly 12 from a forward separation away from backing assembly 14. It can thus be seen that lens assembly 12 is adequately supported in all directions of possible movement which would bring it out of engagement with backing assembly 14. Further, the engagement is maintained with only two prongs for each lens-receiving section, thus reducing the number of welding operations required to fabricate the backing assembly.

As shown throughout the Figures, glasses 10 also include nosepads 70 which are secured to lens-receiving sections 20 through wire supports 72, one end of which is welded to backing assembly 14 in the customary manner. Eyeglasses 10 further include temple pieces 80 adapted to engage the wearer's temple at their forward end, and to engage the wearer's ear at their rearward end. To facilitate in securing temple pieces 80 to backing members 32, a stub section 84 is welded at its forward end to the lateral extremity of backing member 32, at its rearward surface. Hinges 90 join temple pieces 80 to stub members 84.

As indicated above, the lens assembly 12 is securely fastened to backing assembly 14 and is constrained against all of its directions of possible movement relative thereto. The rearward upper surfaces of lens-receiving sections 20 may be recessed to facilitate reception of backing members 32, thereby providing enhanced engagement and alignment between the two assemblies 12, 14. Although this recessed feature may be conveniently carried out when the lens-receiving sections are formed of molded plastic, such is not required by the present invention, owing to the enhanced engagement provided by the hook and lower bridge members 54, 46. In the illustrated embodiment, only prongs 60 are received in recesses formed in the lens assembly. The central prongs 42 engage the uninterrupted forward surface of lens-receiving sections 20.

The eyeglasses of the present invention thus provide a two-piece construction consisting of a lens assembly which may be formed from a variety of lens colors and lens-surrounding materials, supported on a metallic backing assembly. The upper, horizontal portion of the backing assembly can either be completely hidden behind the lens-surrounding material of len-receiving sections 20, or as is preferred, it may be elevated slightly thereabove to provide a gold highlight, for example.

Although the lens assembly 12 in its lens-receiving and joining sections is illustrated as plastic material, it may be readily formed of other materials, such as aluminum or other lightweight metals. The structural integrity required for the hinged support and camming portions of retaining clip 40 is conveniently satisfied in the illustrated embodiment by forming the member from a round wire stock. The remainder of backing assembly 14 is also conveniently made from the same round wire material. However, if for purposes of aesthetic appeal or electrical safety, a nonconductive material is required for the backing assembly 14, a high-strength plastic which may be reinforced with glass fibers can be employed, although a slight decrease in the overall ruggedness of the eyeglasses may result.

Figure 6:
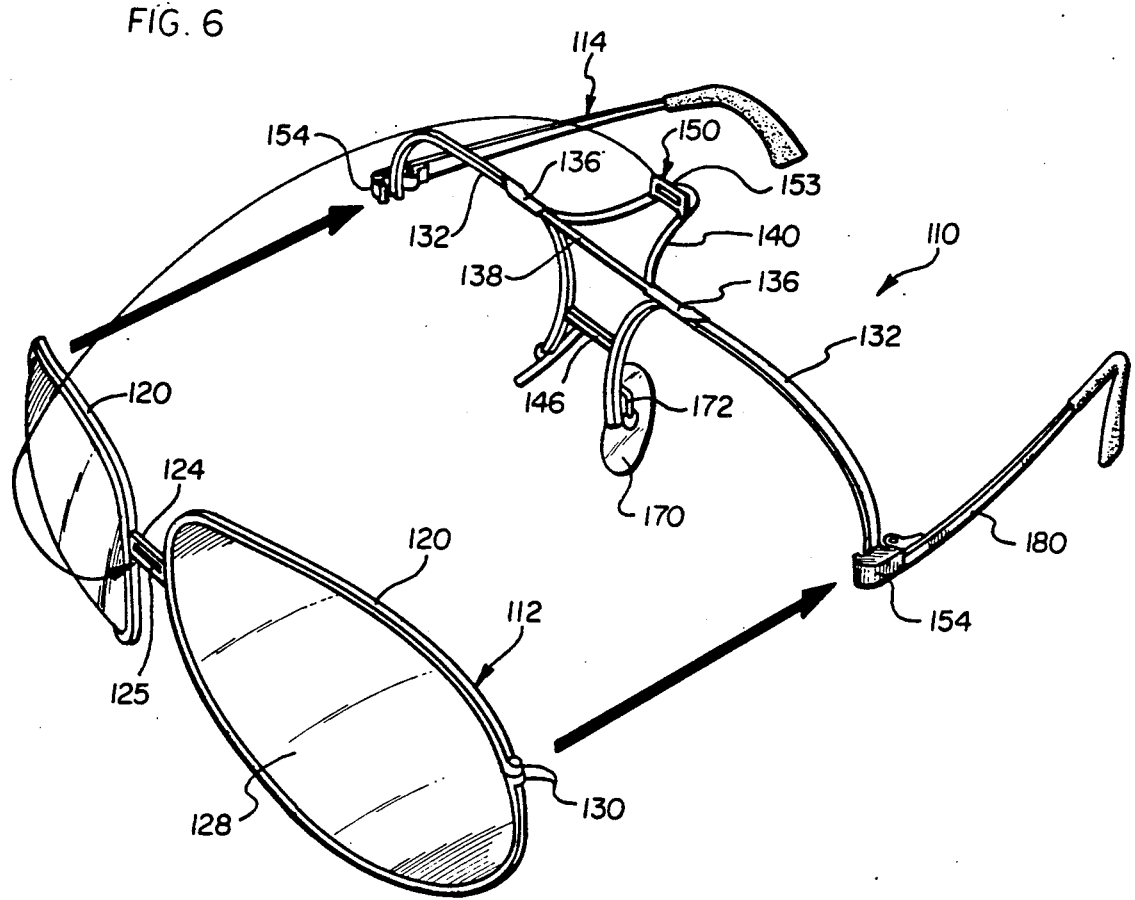
FIG. 6 is an exploded perspective view of a second embodiment of eyeglasses constructed according to the present invention.
Figure 7:
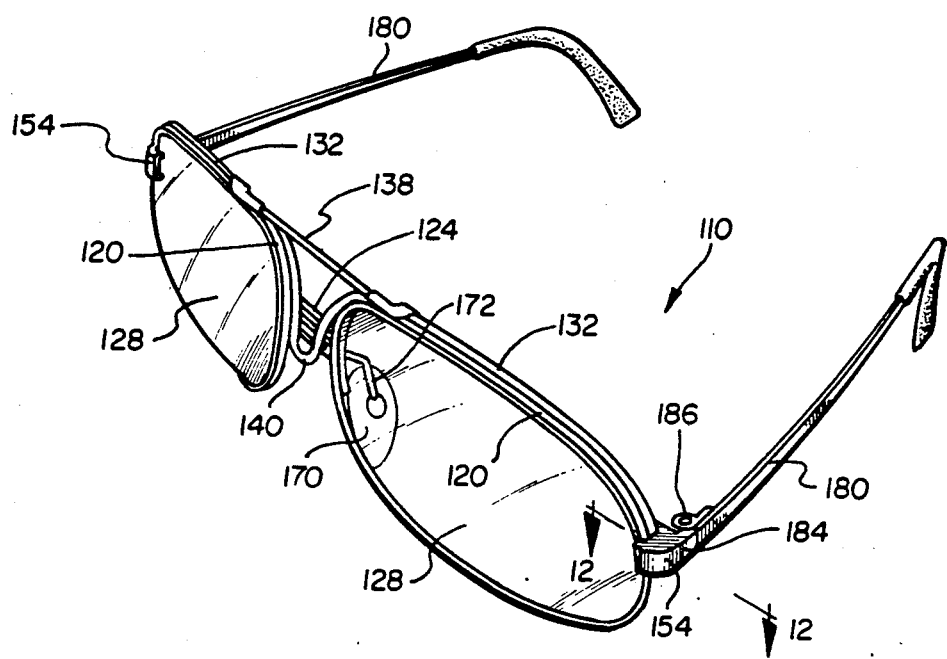
FIG. 7 is a perspective view of the eyeglasses of FIG. 6 shown in a fully assembled condition.

Turning now to FIGS. 6-12, eyeglasses 110 constructed in accordance with a second embodiment of the present invention are shown in an exploded perspective view indicating a preferred mode of assembly. Eyeglasses 110 include a lens assembly indicated generally at 112, and a frame mounting or backing assembly indicated generally at 114. As will be explained, FIGS. 7 and 8 show the eyeglasses in a fully assembled condition, ready for use by a wearer. While one particular shape or configuration of lenses and lens assembly is shown, the present invention is not intended to be so limited, as it can be readily adapted to accommodate a great variety of lens shapes.

Lens assembly 112 includes lens mounting or receiving portions 120 connected together by a slotted joining section 124. Located in the center of joining section 124, for purposes to be explained later, is a central slot 125. In the preferred embodiment, lens-receiving sections 120 and joining sections 124 are preferably made of wire and metal members welded together in a customary manner. In particular, each lens-receiving portion is split at its laterally outer end to provide a ready mounting of a lens 128. Referring additionally to the enlarged fragmentary view of FIG. 11, lens-receiving portions 120 are split into upper and lower portions joined together by a screw 131 at opposed, mating lugs 130. The mating lugs 130 together form a male coupling member which provides mating coupling with a socket-like portion 154 of backing member 114. Alternatively, the lens assembly 112 can be made of plastic, in a unitary molding which includes lugs 130 and central slot 125.

Backing assembly 114 is preferably formed of metal components welded together in a customary manner. Backing assembly 114 includes backing members 132 which engage the rear surface of lens assembly 112, located immediately adjacent the wearer's face. An upper bridge 134 is positioned between backing members 132 and is welded at either end at 136. The upper bridge 134 is hidden from view in all of the Figures except the cross-sectional view of FIG. 9, by an outer tubular member 138 which receives rotational mounting from the inner upper bridge 134. A bail-like retaining clip 140 is affixed to tube 38 by a welded joinder.

With reference to FIGS. 6 and 9, a lower bridge member 146 connects backing members 132 by welded securement at each of its ends. Retaining clip 140 includes a locking detent or camming member 150, hook-like in cross-section, which snaps over the lower portion of the lower bridge 146, as seen most clearly in the cross-sectional view of FIG. 9. Referring to FIG. 10, enhancement of the detent action is provided by detent member 150 which includes a central depression 151 formed in its lateral ends 152 such that its innermost member 153 (extending generally parallel to bridging section 124 and located closest to the wearer's face) provides a slight projection which cams over the lower surface of the lower bridge 146. Slot 125 formed in bridging section 124 is dimensioned to allow the insertion of camming member 150 therethrough, and the aforedescribed detent engagement with lower bridge 146, which provides a secure retention for the central portion of lens assembly 112 on the backing member 114. If desired, camming member 150 may be upwardly inclined at its rearmost surface in a manner similar to that shown in FIG. 3 to provide added retention.

Backing member 114 further includes socket constructions 154 at their lateral ends. As shown in the Figures, sockets 154 conveniently provide a forward extension of ear-engaging temple members 80, which facilitate mounting of eyeglasses 110 to a wearer's head, as is known in the art. As shown most clearly in the cross-sectional view of FIG. 12, sockets 154 are hollow, having an opening facing the central portion of the eyeglasses. The male coupling formations previously described, formed by the screw mating of lugs 130, are received in the hollow interior of sockets 154 to provide a close-fitting joinder for the secure attachment of the lateral ends of lens assembly 112 to the backing member 114. As can now be seen, lens assembly 112 is provided with three points of attachment to backing member 114 which affords a secure inter-engagement while providing a ready exchange of different-colored lenses and lens assemblies.

As shown, glasses 110 include nosepads 170 which are secured to lens-receiving sections 120 by wire-like supports 172.

To provide a convenient mounting to temple members 180, backing member 114 includes a stub-like hinge portion 184 (see FIG. 12) which hingedly interconnects with temple member 180 in a customary fashion, the hinge joinder being secured together with a screw 186.

With reference to FIGS. 6, 11 and 12, eyeglasses 10 are assembled by raising bail 140 in an upward direction, as indicated in FIG. 6. Thereafter, lens assembly 112 is brought into engagement with backing member 114 by a slight outward bowing of the lens assembly to allow insertion of the lugs 130 in the socket extensions 154. As lug formations 130 are received into the hollow interior of socket 154 as indicated in FIG. 12, bridging section 124 will be brought into engagement with the lower bridge 146 and the inner ends of backing members 152 located adjacent nosepads 170. Thereafter, bail 140 is pivoted in a downward direction so as to insert camming member 150 through central slot 125, coming into engagement with the lower bridge 146 to achieve a detent locking engagement illustrated in FIGS. 9 and 10.

As described above, the preferred arrangement for releasably locking the lens assembly to the backing member comprises two variations of a pivotally-mounted retaining clip. These arrangements are preferred in that only two assemblies are presented to a user. However, other arrangements for locking the lens assembly to the backing member are possible, and are contemplated by the present invention. For example, referring to FIG. 6, the camming member 150 can be separately formed, without the curved arm portions joining the camming member to the weld connections 136. The camming member could conveniently be provided with a button-like head having an inwardly protruding body, the innermost end of which engages the mounting bar 146. Alternatively, the bridge 124 of the lens assembly 112 could be provided with a slot 125 dimensioned to receive a rivet having a split free end received in the mounting bar 146 of the backing member.

According to other aspects of the present invention, several embodiments of eyeglass frame assemblies have been described. In general, each of the frame assemblies includes lens-receiving or lens-mounting sections such as the sections 120 shown in FIG. 6. A bridge such as bridge 124 is positioned intermediate the lens-receiving members and has its generally opposed ends joined thereto to form a unitary frame construction. Further, each frame assembly is provided with multiple points of releasable connection to a supporting backing member. For case of storage, and to provide a unique lightweight and attractive appearance, the frame assemblies have a generally planar configuration, substantially free of protrusions and the like. This can be readily seen in the perspective views of FIGS. 4 and 6 showing two different lens assemblies, 12 and 112, respectively. To provide an intimate engagement with the lens assemblies, the backing member is conveniently provided with a similar complementary-shaped planar mating surface. This provides adequate mounting of a frame assembly to a backing member with only a few spaced apart engaging members of relatively small mass. In the first example, that shown in FIGS. 1-5, the attaching members include outwardly extending prongs carried on the backing member, and prong-receiving recesses on the lens assembly. In the second example, that of FIGS. 6-12, the attachment is provided by outwardly protruding mounting lugs 130 received in socket portions of the backing member. These attaching means described for each example are, according to some aspects of the present invention, advantageously located at the lateral outside end of the frame assembly. Indeed, in the second embodiment of FIGS. 6-12, only one attaching means is provided for each lens-receiving portion. This has been found to be very adequate, since the single point of attachment is located at the outside lateral end of the lens-receiving portion, rather than some other location. Referring to the first described arrangement, that of FIGS. 1-6, the centrally located prongs 42 can be omitted if desired, leaving only the laterally outer prongs 60 to provide the sole point of attachment directly to the lens-receiving portions. Additionally, in each described embodiment, mounting of the lens assembly to the backing member is completed by some form of attachment between the bridging member located intermediate the lens-receiving portions and the central portion of the backing member. In the preferred embodiments, this attachment is preferably provided by a detent arrangement carried at the free end of a swinging or a pivotally-mounted clip. However, as described immediately above, other arrangements such as rivets or the like for attaching the bridge of the lens assembly to a bridge of the backing member can also be used.

Although the preferred form of the lens assembly is that of a generally planar configuration without protrusions, other arrangements are also contemplated by the present invention. For example, a rearwardly-extending pincer-like clip can be integrally formed with the bridge 24, 124 of the two embodiments described above. The pincer-like clip would, in either embodiment, provide simple spring-like engagement with the lower mounting bar of the backing member.

While preferred embodiments of the present invention have been illustrated and described, it will be understood to those skilled in the art that changes and modifications may be made therein without departing from the invention in its broader aspects. Various features of the invention are defined in the following claims.

What is claimed is:

1. An eyeglass frame assembly comprising:
a pair of eyeglass lenses; and
a generally planar unitary frame including, a pair of lens-receiving means for mounting said lenses, each surrounding an outer periphery of one said lens and having an outside lateral end, a bridge intermediate the lens-receiving means and having generally opposed ends joined thereto, first means on said bridge and second means on the outside lateral ends of said lens-receiving means for engaging spaced portions of a backing member complementary shaped with respect to said unitary frame and having head-engaging means for positioning the unitary frame on the head of a wearer, and the first means comprising a hook-shaped protrusion rearwardly and downwardly extending from the bridge so as to form a recess for engaging a lateral bar carried on a backing member to which the eyeglass frame assembly is mounted.

2. An eyeglass frame assembly comprising: a pair of eyeglass lenses; and a generally planar unitary frame including, a pair of ring-like lens-mounting portions for mounting said lenses, each surrounding an outer periphery of one said lens and having an outside lateral end, a bendable bridge intermediate the lens-mounting portions and having generally opposed ends joined thereto, and an aperture defined by said bridge for receiving a locking projection telescopically inserted therethrough in a direction generally perpendicular to major surfaces of the lenses, and locking projections at opposed lateral ends of the ring-like lens mounting portions, engageable in mounting sockets of a backing member upon slight bending of the bridge member.

* * * * *